(12) United States Patent
Misbach

(10) Patent No.: US 7,664,848 B2
(45) Date of Patent: Feb. 16, 2010

(54) SYSTEM AND METHOD FOR MONITORING NETWORKED DEVICES EMPLOYING RSS FUNCTIONALITY

(75) Inventor: Matthew Almon Misbach, Orem, UT (US)

(73) Assignee: Novell, Inc., Provo, UT (US)

( * ) Notice: Subject to any disclaimer, the term of this patent is extended or adjusted under 35 U.S.C. 154(b) by 590 days.

(21) Appl. No.: 11/142,466

(22) Filed: Jun. 2, 2005

(65) Prior Publication Data

US 2006/0277291 A1    Dec. 7, 2006

(51) Int. Cl.
*G06F 15/173* (2006.01)
*G05B 11/01* (2006.01)

(52) U.S. Cl. .......................... 709/224; 709/223; 700/19

(58) Field of Classification Search ......... 709/223–224; 700/19
See application file for complete search history.

(56) References Cited

U.S. PATENT DOCUMENTS

| | | | |
|---|---|---|---|
| 7,099,870 B2* | 8/2006 | Hsu et al. | 707/10 |
| 7,246,014 B2* | 7/2007 | Forth et al. | 702/60 |
| 2002/0059410 A1* | 5/2002 | Hara et al. | 709/223 |
| 2005/0165927 A1* | 7/2005 | Motoyama et al. | 709/224 |
| 2005/0188078 A1* | 8/2005 | Kotzin et al. | 709/224 |
| 2005/0197989 A1* | 9/2005 | Hori et al. | 706/47 |
| 2007/0100900 A1* | 5/2007 | Gibbins | 707/201 |
| 2007/0192867 A1* | 8/2007 | Miliefsky | 726/25 |

OTHER PUBLICATIONS

WebReference.com, Introduction to RSS, Syndication and Aggregation, and WebRef and the Future of RSS, printed from web site http://www.webreference.com/authorizing/languages/xml/rss, printed on Jun. 2, 2005, 9 pages.

\* cited by examiner

*Primary Examiner*—Jeffrey Pwu
*Assistant Examiner*—Guang Li
(74) *Attorney, Agent, or Firm*—Pillsbury Winthrop Shaw Pittman LLP

(57) ABSTRACT

A system and method are provided for monitoring networked devices using RSS. Status information from the one or more networked devices may be collected by an RSS aggregator. The status information may be assembled into one or more RSS feeds, enabling a user such as an administrator to monitor the status of the network from any network accessible location.

23 Claims, 3 Drawing Sheets

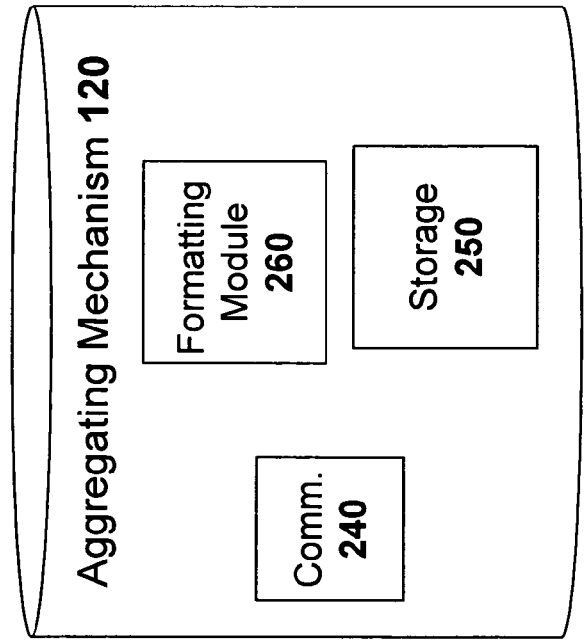
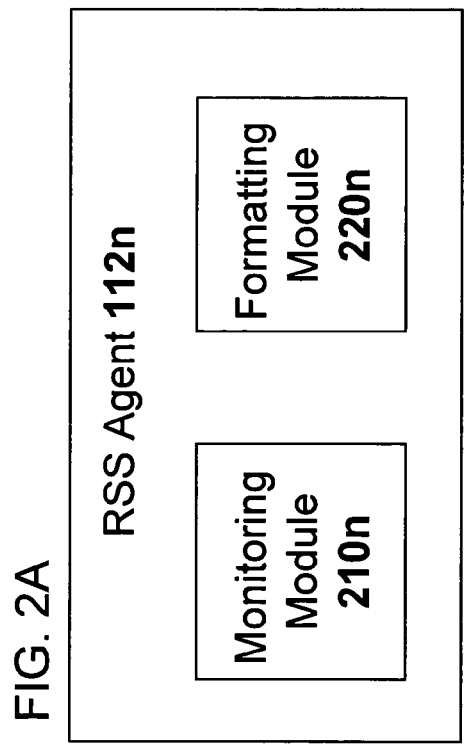

SYSTEM AND METHOD FOR MONITORING NETWORKED DEVICES EMPLOYING RSS FUNCTIONALITY

FIELD OF THE INVENTION

The invention relates to a system and method that employs RSS functionality to monitor status information associated with one or more network devices.

BACKGROUND OF THE INVENTION

RSS technology, also known as "Really Simple Syndication" or "Rich Site Summary," is a fairly new tool commonly used in news gathering. In operation, RSS provides an efficient way to distribute or share news-related items between web sites. For example, by employing RSS, individuals can receive news content from a variety of RSS-compliant news services.

RSS is based on an XML grammar that defines data items with HTML-like meta tags. RSS text files are generally formatted with static information about a website as well as dynamic information regarding the sought-after content. The RSS text file encapsulates both sets of information as RSS XML data items and sandwiches the data items between matching beginning and end tags. The RSS formatted text file can then be registered with an RSS Aggregator. RSS Aggregators are RSS-aware programs that are capable of checking and collecting the feeds containing the sought-after RSS XML items from multiple sources. The sought-after content may then be accessed by any Internet-accessible location. As such, RSS provides a convenient, efficient, and virtually ubiquitous platform for the distribution and collection of news-related content.

In contrast, system administrators, responsible for the overall health of their network infrastructure, do not have such a platform at their disposal. Currently, system administrators have to mine status information from multiple, often disparate, sources to obtain an adequate representation of the state of the network infrastructure.

SUMMARY OF THE INVENTION

A system and method for monitoring networked devices employing RSS technology is presented herein. The system may include one or more devices interconnected through a network. The one or more networked devices may be configured to transmit status information.

The system may further include an aggregation mechanism communicatively coupled to the one or more networked devices. The aggregation mechanism may be configured to receive the status information transmitted by the networked devices, store the received status information, and provide Internet-enabled capability. The stored information may be formatted in accordance with RSS standards and the stored status information may be accessed via Internet-enabled communications.

According to some embodiments of the invention, status information of one or more networked devices may be obtained and transmitted to an aggregation mechanism. Upon receipt of the status information, the aggregation mechanism may store the received status information in accordance with RSS standards.

According to some embodiments of the invention, status information may be automatically generated by a networked device with RSS XML formatting. In other embodiments of the invention, the aggregation mechanism may poll a networked device to retrieve its status information and may format the retrieved status information as an RSS XML item.

The status information may be obtained by an administrator or other designated user via Internet-enabled communication. The administrator or user may request the status information as a single feed describing all monitored networked devices. Alternatively, the administrator or other user may obtain the status information as individual feeds for an individual networked device or group of networked devices.

BRIEF DESCRIPTION OF THE DRAWINGS

FIG. 2A illustrates an RSS Agent associated with a client device, in accordance with various embodiments of the invention.

FIG. 2B illustrates an aggregation mechanism, in accordance with various embodiments of the invention.

DETAILED DESCRIPTION OF PREFERRED EMBODIMENTS

In accordance with various disclosed embodiments, the present invention contemplates systems and methods that employ RSS functionality to monitor, collect, and provide access to status information of networked devices. As described above, RSS is typically used to distribute news items. However, by expanding the use of RSS functionality to include the monitoring of networked devices, status information of such devices may be consolidated and accessed from any Internet-accessible location.

Figure 1:
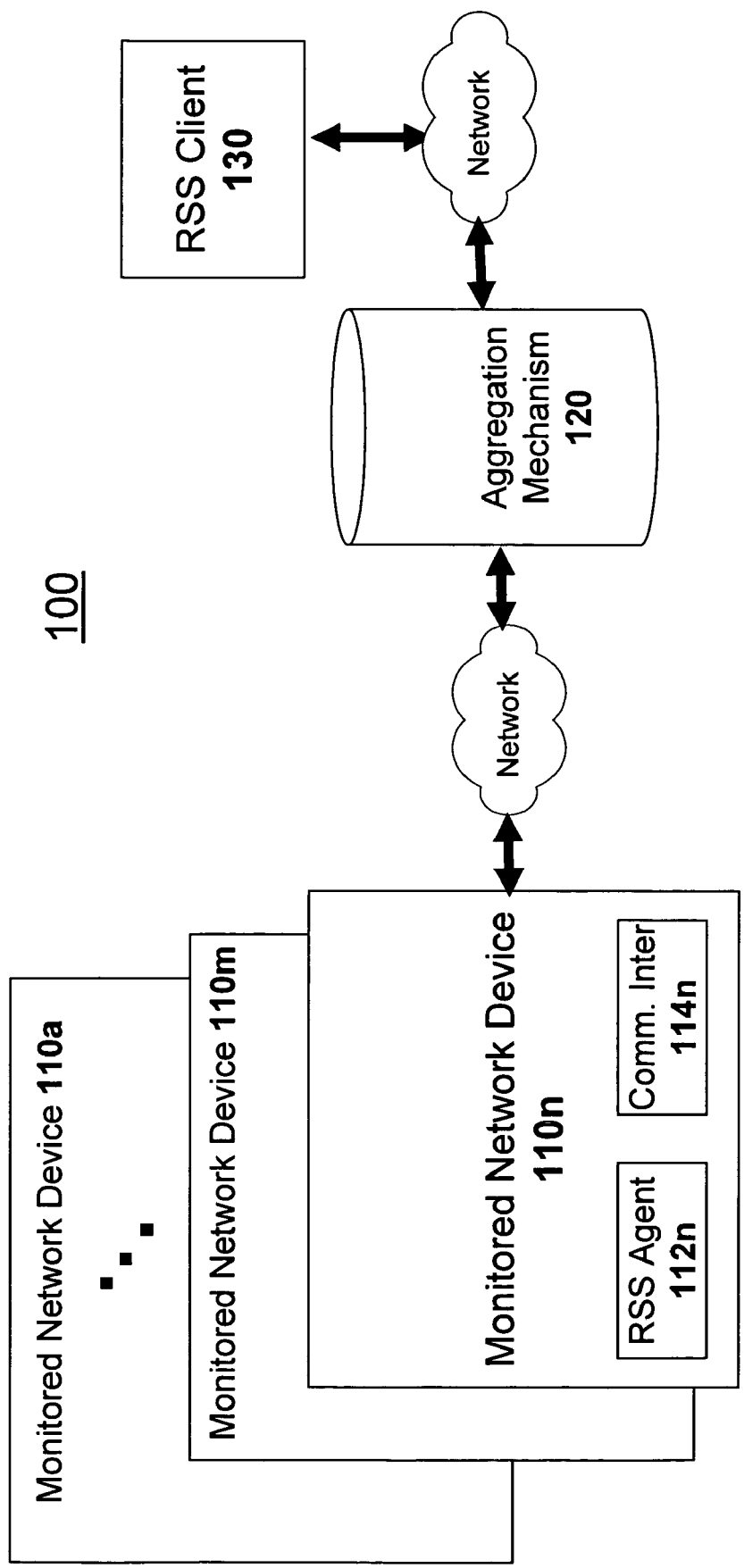
FIG. 1 illustrates a network system, in accordance with various embodiments of the invention.

Consistent with these embodiments, FIG. 1 depicts a system 100 comprising one or more monitored network devices 110a-110n communicatively coupled to aggregation mechanism 120. System 100 may also include an RSS Client device 130 capable of communicating with aggregation mechanism 120 via network-enabled connectivity. Monitored network devices 110a-n, aggregation mechanism 120, and RSS Client device 130 may communicate amongst each other over a network such as a local area network (LAN), wide area network (WAN), the Internet, or any other network connection.

Monitored network device 110n may include any network device such as, for example, a server, a printer, a router, a workstation, and/or other devices connected to a network. As such, monitored network device 110n may include a communications interface 114n that facilitates communications with aggregation mechanism 120 via the associated network infrastructure.

According to some embodiments of the invention, monitored network device 110n may include an RSS Agent 112n, as depicted in FIG. 1. RSS Agent 112n may be configured to obtain information indicating the status of resident networked device 110n. This status information may then be used by an administrator to monitor the operations of the network device 110n.

As depicted in FIG. 1, RSS Client 130 may be any electronic device capable of connecting to the Internet. For example, RSS Client 130 may be a laptop or desktop computer, a portable digital assistant (PDA), a Blackberry, an Internet-enabled mobile telephone, and/or other electronic devices capable of connecting to the Internet. RSS Client 130 may be used to retrieve status data gathered by aggregation mechanism 120.

As noted above, each monitored network device 110n may include an RSS Agent 112n configured to obtain status information of monitored network device 110n. As depicted in FIG. 2A, RSS Agent 112n may comprise monitoring module 210n and formatting module 220n.

Monitoring module 210n may be configured to obtain status information regarding the status of the resident networked device 110n relative to pre-specified device parameters. That is, status information may include, for example, whether the device 110n is operating properly, is deactivated for maintenance or otherwise unreachable, the load associated with the device, the temperature of the device, operations performed by the device, and/or any other defined device parameters.

According to some embodiments of the invention, monitoring module 210n may obtain status information of a monitored networked device 110n at predefined time intervals. In other embodiments, such status information may be obtained by monitoring module 210n from network device 110n whenever there is a change in status.

As described above, RSS technology typically uses formatted RSS XML items to distribute news-related content information. In accordance with embodiments of the invention, formatting module 220n of RSS Agent 112n may be configured to parse and format the retrieved status information into RSS XML data items. Each RSS XML item should include a title identifying the monitored network device 110n and a description of the status of the monitored network device 110n. Other information may be included in accordance with RSS standards. An example of a formatted RSS XML item for a server (Server_1) is depicted below:

```
<item>
    <title>SLES 9 Server_1</title>
    <description>
        Server_1 just performed a Red Carpet upgrade.
    </description>
</item>
```

Returning to FIG. 1, system 100 also includes aggregation mechanism 120. Aggregation 120 may be configured to receive, collect, and store the status information provided by each of the monitored network devices 110a-110n as well as provide access to such information. Aggregation mechanism 120 may comprise a hardware device or a software module installed on a computer device.

Aggregation mechanism 120 is configured to communicate with monitored network devices 110a-110n via the associated network infrastructure and may also include an Internet-enabled communications mechanism to facilitate communications with RSS Client 130. Accordingly, as depicted in FIG. 2B, aggregation mechanism 120 may include communication interface 240.

Because aggregation 120 may receive the status information provided by each of the monitored network devices 110a-110n, aggregation 120 may be configured with storage facility 250 to collect and store such information.

Aggregation mechanism 120 may employ a list of monitored network devices 110a-110n from which status information is to be obtained and received. Aggregation mechanism 120 may also be configured with the capability of executing polling procedures on networked devices 110a-110n. Polling may be performed using any known monitoring and reporting protocol, such as, for example, SNMP.

Aggregation mechanism 120 may also be configured with the capability of consolidating the status information received from each of the monitored networked devices 110a-110n. In addition, aggregation mechanism 120 may also be equipped with the capability of parsing and formatting status information received from networked devices 110a-110n into RSS XML data items, as indicated by formatting module 260. Formatting module 260 may be configured similar to, or operate in similar fashion as, the aforementioned formatting module 220 of RSS Agent 112n.

With this said, embodiments of the invention also contemplate providing RSS monitoring functionality for a networked device 110i that does not employ an RSS Agent 112i. As described above, aggregation mechanism 120 may incorporate a list of networked devices 110a-110n from which status information is to be obtained and received as well as having polling capabilities to determine a networked device's 110i status information.

Equipped with such functionality, aggregation mechanism's 120 list of network devices 110a-110n may be configured to specifically include a field within the list that indicates whether the networked device 110n includes an RSS Agent 112n that obtains and supplies the status information to aggregation mechanism 120 as RSS XML items or whether the aggregation mechanism 120 should execute polling procedures on the networked device 110n to initiate the retrieval of status information.

Thus, in cases where networked device 110i does not employ an RSS Agent 112i, aggregation mechanism 120 may initiate a request to networked device 110i via a network monitoring protocol. For example, the network monitoring protocol may be SNMP, CIMP, HEMP, SGMP, or other known network monitoring protocols. Such request may be a request for a response that indicates status information relative to the pre-specified device parameters for networked device 110i.

Once aggregation mechanism 120 receives the networked device's 110i polling response indicating status information, aggregation mechanism 120 may be configured to parse and format the received status information into RSS XML data items.

Figure 3:
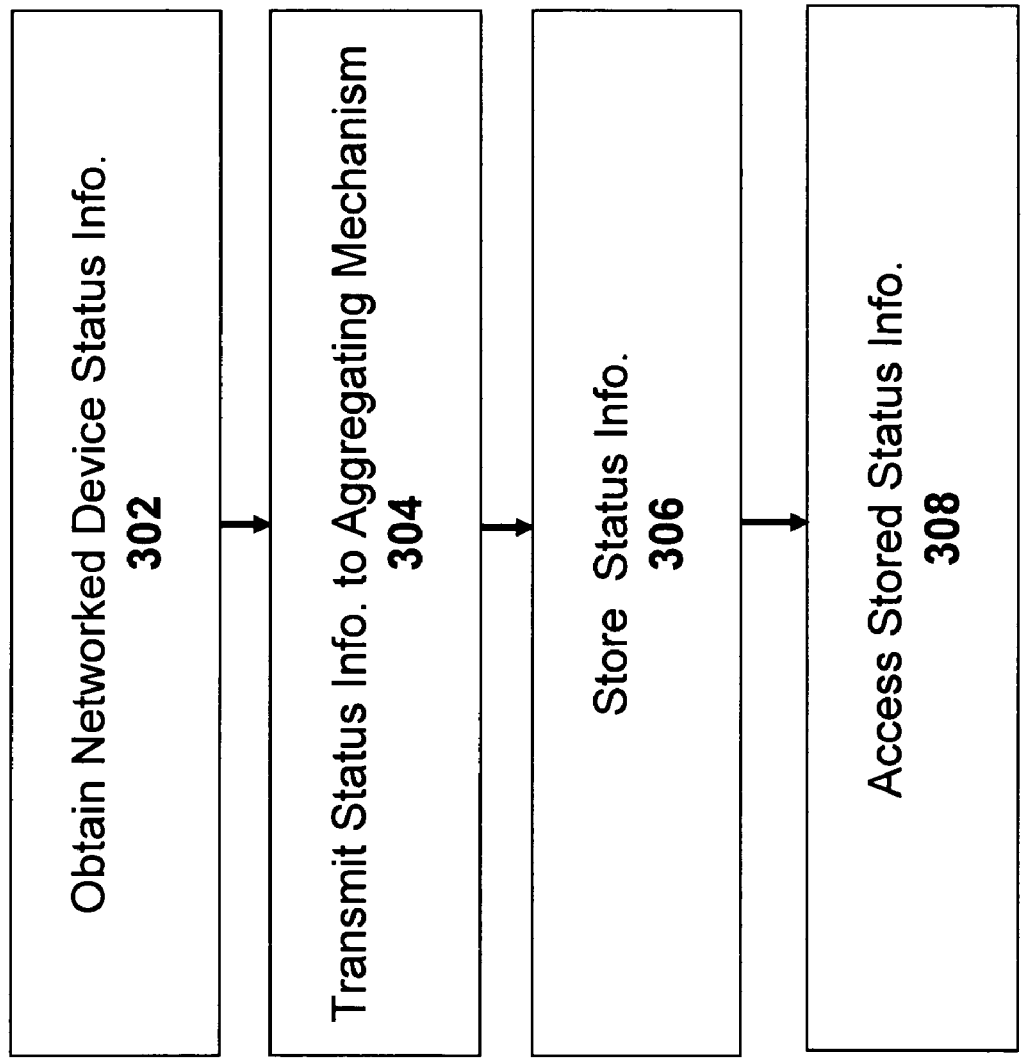
FIG. 3 illustrates a process for monitoring network devices, in accordance with various embodiments of the invention.

FIG. 3 illustrates process 300, constructed and arranged to perform the monitoring of one or more networked devices employing RSS functionality, in accordance with embodiments of the present invention. As noted above, the present invention may be used to monitor network device 110n that includes an RSS Agent 112n as well as those network devices 110i that do not include an RSS Agent 112i.

As depicted at operation 302 of process 300, the status information for a monitored network device 110n is obtained. For networked devices 110n that include an RSS Agent 112n, monitoring module 210n of RSS Agent 112n may monitor one or more of the pre-specified device parameters of the network device 110n to ascertain status information of the device 110n relative to those parameters. For example, monitoring module 210n of RSS Agent 112n may determine the network load associated with a particular networked device, the last action performed by the networked device, or any other pre-specified device parameter. Status information of a monitored networked device 110n may be obtained from network device 110n at predefined time intervals or, alternatively, when there is a change in such status.

For networked devices 110i that do not include RSS Agent 112i, aggregation mechanism 120 may be configured to poll each if those device's 112i to determine status information relative to one or more pre-specified device parameters, as discussed above. For example, aggregation mechanism 120 may poll networked device 110i by transmitting SNMP messages to network device 110*i* and request a response that indicates status information relative to the pre-specified device parameters.

As depicted at operation 304, the obtained status information is transmitted to aggregation mechanism 120. For the embodiments in which networked devices 110*n* are configured with RSS Agents 112*n*, formatting module 220*n* of RSS Agent 112*n* may parse and format the obtained status information into RSS XML items. The status information may then be transmitted to aggregation mechanism 120 as formatted RSS XML items via communications interface 114*n* of network device 110*n*.

For embodiments in which network devices 110*i* are not configured with RSS Agents 112*n*, networked device 110*i* transmits the status information to aggregation mechanism 120 in response to the polling procedure initiated by aggregation mechanism 120. The status information may be formatted in any format consistent with the monitoring/reporting protocol used to poll networked device 110*i*. Once the status information is received by aggregation mechanism 120, formatting module 260 of aggregation mechanism 220 may format the received status information into RSS XML items.

At operation 306, aggregation mechanism 120 stores the received status information via storage mechanism 250. It will be appreciated that the received status information may be stored in accordance with known methods and may be stored as individualized entries for each networked device 110*n* or as hierarchical groups of networked devices 110*a*-110*n*.

At operation 308, the stored status information may then be accessed by RSS Client 130. As noted above, aggregation mechanism 120 includes Internet-enabled communications mechanism 270 to facilitate communications with RSS Client 130, so that the stored status information may be accessed from any Internet-accessible location. For example, RSS Client 130 may simply enter a network address, such as a uniform resource locator (URL) associated with aggregation mechanism 120 to access the stored status information.

The status information may be provided to client device 130 through one or more RSS feeds. In accordance with some embodiments of the invention, aggregation mechanism 120 may generate a single feed that supplies the stored status information for all monitored network devices 110*a*-110*n*. In other embodiments, aggregation mechanism 120 may assemble separate RSS feeds for each monitored networked device 110*n* or groups of monitored networked devices 110*a*-110*k*, enabling an administrator to retrieve status information for one or more particular networked device rather than for all monitored network devices.

Other embodiments, uses, and advantages of the invention will be apparent to those skilled in the art from consideration of the specification and practice of the invention disclosed herein. This specification should be considered exemplary only, and the scope of the invention is accordingly intended to be limited only by the following claims.

What is claimed is:

1. A system for monitoring status of a network, comprising:
   one or more monitored devices interconnected through a network, the one or more monitored networked devices configured to transmit status information;
   at least a first monitored networked device of the one or more monitored networked devices that includes an RSS-compliant module configured to:
      obtain status information of the first monitored networked device; and
      format the status information of the first monitored networked device in accordance with RSS standards,
      wherein the first monitored networked device is configured to transmit the RSS formatted status information;
   at least a second monitored networked device of the one or more monitored networked devices that does not include the RSS-compliant module, wherein the second monitored networked device is configured to transmit status information that is not formatted in accordance with RSS standards; and
   an aggregation mechanism communicatively coupled to the one or more monitored networked devices via the network, the aggregation mechanism configured to:
      receive the RSS formatted status information transmitted and formatted by the first monitored networked device;
      determine whether each of the one or more monitored networked devices includes an RSS-compliant module that obtains status information of the monitored networked devices and formats the status information in accordance with RSS standards;
      in response to a determination that the second monitored networked device does not include the RSS-compliant module, the aggregation mechanism further configured to:
         initiate a request to the second monitored networked device for the non-RSS formatted status information via a network monitoring protocol,
         receive, from the second monitored networked device, a response to the network monitoring protocol request that provides the non-RSS formatted status information in a format consistent with the network monitoring protocol, and
         format the received non-RSS formatted status information of the second monitored networked device in accordance with RSS standards; and
      store the RSS formatted status information associated with the first monitored networked device that is formatted by and received from the first monitored networked device and the RSS formatted status information associated with the second monitored networked device that is formatted by the aggregation mechanism.

2. The system of claim 1, wherein the RSS-compliant module of first monitored networked device is configured to format the status information into one or more RSS XML items.

3. The system of claim 1, wherein the RSS-compliant module of first monitored networked device further comprises:
   a monitoring module configured to determine the status information of the first monitored networked device relative to one or more pre-specified device parameters; and
   a formatting module configured to format the determined status information into one or more RSS XML items.

4. The system of claim 3, wherein the monitoring module is configured to determine the status information at pre defined time intervals.

5. The system of claim 3, wherein the monitoring module is configured to determine the status information whenever there is a change in status relative to the one or more pre-specified device parameters.

6. The system of claim 3, wherein each of the one or more RSS XML items includes at least a title associated with the first monitored networked device and a description of the status of at least one or the one or more pre-specified device parameters.

7. The system of claim 1, wherein the aggregation mechanism is configured to automatically receive the RSS formatted status information transmitted by the first monitored networked device as one or more RSS XML items.

8. The system of claim 1, wherein the status information transmitted by each of the one or more monitored networked devices includes one or more of the following: a network load associated with the monitored networked device, whether the monitored networked device is deactivated for maintenance, a last operation performed on the monitored networked device, or the temperature of the monitored networked device.

9. The system of claim 1, wherein the aggregation mechanism is further configured to:
format the received non-RSS formatted status information of the second monitored networked device into one or more RSS XML items.

10. The system of claim 1, wherein the aggregation mechanism employs a list of the one or more monitored networked devices to determine whether each of the one or more networked devices includes an RSS-compliant module, wherein the list of the one or more monitored networked devices includes a field within the list that indicates whether a particular monitored networked device includes an RSS-compliant module or not.

11. A method of monitoring the status of a network, comprising:
receiving, by an aggregation mechanism, status information from one or more monitored networked devices, wherein at least a first monitored networked device of the one or more monitored networked devices includes an RSS-compliant module that obtains status information of the first monitored networked device, and formats the status information of the first monitored networked device in accordance with RSS standards, wherein the first monitored networked device transmits the RSS formatted status information, wherein at least a second monitored networked device of the one or more monitored networked devices does not include the RSS-compliant module, wherein the second monitored networked device transmits status information that is not formatted in accordance with RSS standards, and wherein the aggregation mechanism receives the RSS formatted status information from the first monitored networked device and receives the non-RSS formatted status information from the second monitored networked device;
determining, by an aggregation mechanism, whether each of the one or more monitored networked devices includes an RSS-compliant module that obtains status information of the monitored networked devices and formats the status information in accordance with RSS standards;
in response to a determination that the second monitored networked device does not include the RSS-compliant module:
    initiating, by an aggregation mechanism, a request to the second monitored networked device for the non-RSS formatted status information via a network monitoring protocol,
    receiving, by an aggregation mechanism from the second monitored networked device, a response to the network monitoring protocol request that provides the non-RSS formatted status information in a format consistent with the network monitoring protocol, and
    formatting, by an aggregation mechanism, the received non-RSS formatted status information of the second monitored networked device in accordance with RSS standards; and
storing the RSS formatted status information associated with the first monitored networked device that is formatted by and received from the first monitored networked device and the RSS formatted status information associated with the second monitored networked device that is formatted by the aggregation mechanism.

12. The method of claim 11 wherein the
RSS-compliant module of the first monitored networked device is configured to determine the status of the first monitored networked device relative to one or more pre-specified device parameters.

13. The method of claim 11, wherein the RSS-compliant module of the first monitored networked device formats the status information for the first monitored networked device into one or more RSS XML items.

14. The method of claim 11, wherein the RSS-compliant module of the first monitored networked device is configured to obtain the status information by collecting the status information at pre-scheduled time intervals.

15. The method of claim 11, wherein the RSS-compliant module of the first monitored networked device is configured to obtain the status information by collecting the status information whenever a change in status occurs.

16. The method of claim 11, further comprising:
providing access to the stored RSS formatted status information via Internet-enabled communications, wherein the providing of access to the stored RSS formatted status information further comprises:
generating one or more RSS feeds that supply the stored RSS formatted status information; and
receiving an Internet request to access the one or more RSS feeds.

17. The method of claim 16, wherein one of the one or more RSS feeds is a cumulative feed that supplies the stored RSS formatted status information for each of the one or more monitored networked devices.

18. The method of claim 11, further comprising:
employing, by the aggregation mechanism, a list of the one or more monitored networked devices to determine whether each of the one or more networked devices includes an RSS-compliant module, wherein the list of the one or more monitored networked devices includes a field within the list that indicates whether a particular monitored networked device includes an RSS-compliant module or not.

19. An aggregation mechanism for monitoring status of a network, comprising:
a first communications mechanism configured to facilitate communications with the network and receive status information regarding one or more monitored networked devices in the network, wherein at least a first monitored networked device of the one or more monitored networked devices includes an RSS-compliant module that obtains status information of the first monitored networked device, and formats the status information of the first monitored networked device in accordance with RSS standards, wherein the first monitored networked device transmits the RSS formatted status information, wherein at least a second monitored networked device of the one or more monitored networked devices does not include the RSS-compliant module, wherein the second monitored networked device transmits status information that is not formatted in accordance with RSS standards, and wherein the first communication mechanism receives the RSS formatted status information from the first monitored networked device and receives the non-RSS formatted status information from the second monitored networked device;

the aggregation mechanism configured to determine whether each of the one or more monitored networked devices includes an RSS-compliant module that obtains status information of the monitored networked devices and formats the status information in accordance with RSS standards;

in response to a determination that the second monitored networked device does not include the RSS-compliant module, the aggregation mechanism further configured to:

initiate a request to the second monitored networked device for the non-RSS formatted status information via a network monitoring protocol, receive, from the second monitored networked device, a response to the network monitoring protocol request that provides the non-RSS formatted status information in a format consistent with the network monitoring protocol, and format the received non-RSS formatted status information of the second monitored networked device in accordance with RSS standards;

a storage mechanism configured to store the RSS formatted status information associated with the first monitored networked device that is formatted by and received from the first monitored networked device and the RSS formatted status information associated with the second monitored networked device that is formatted by the aggregation mechanism; and a second communications mechanism configured to facilitate Internet-enabled communications, wherein the stored status information is accessed via the Internet-enabled communications.

20. The aggregation mechanism of claim 19, further comprising a formatting mechanism that is configured to format the received non-RSS formatted status information of the second monitored networked device into one or more RSS XML items.

21. The aggregation mechanism of claim 19, wherein the second communication mechanism receives a request for access to the stored RSS formatted status information, wherein the request includes a network address associated with the aggregation mechanism, and wherein the second communication mechanism, in response to the request, provides access to one or more RSS feeds that supply the stored RSS formatted status information.

22. The aggregation mechanism of claim 21, wherein the one or more RSS feeds are generated by the aggregation mechanism, and wherein the one or more RSS feeds comprise a separate RSS feed for each of the one or more monitored networked devices, or one or more RSS feeds for one or more groups of the one or more monitored networked devices.

23. The aggregation mechanism of claim 19, wherein the aggregation mechanism employs a list of the one or more monitored networked devices to determine whether each of the one or more networked devices includes an RSS-compliant module, wherein the list of the one or more monitored networked devices includes a field within the list that indicates whether a particular monitored networked device includes an RSS-compliant module or not.

* * * * *